US011310671B2

(12) United States Patent
Cariou et al.

(10) Patent No.: US 11,310,671 B2
(45) Date of Patent: Apr. 19, 2022

(54) RESOURCE UNIT NOTCHING FOR INCUMBENT PROTECTION IN THE 6GHZ BAND FOR NEXT-GENERATION WI-FI

(71) Applicant: Intel Corporation, Santa Clara, CA (US)

(72) Inventors: Laurent Cariou, Portland, OR (US); Xiaogang Chen, Portland, OR (US); Feng Jiang, Santa Clara, CA (US); Qinghua Li, San Ramon, CA (US)

(73) Assignee: Intel Corporation, Santa Clara, CA (US)

( * ) Notice: Subject to any disclaimer, the term of this patent is extended or adjusted under 35 U.S.C. 154(b) by 26 days.

(21) Appl. No.: 16/646,319

(22) PCT Filed: Dec. 20, 2017

(86) PCT No.: PCT/US2017/067593
§ 371 (c)(1),
(2) Date: Mar. 11, 2020

(87) PCT Pub. No.: WO2019/125433
PCT Pub. Date: Jun. 27, 2019

(65) Prior Publication Data
US 2021/0368350 A1    Nov. 25, 2021

(51) Int. Cl.
*H04W 16/14* (2009.01)
(52) U.S. Cl.
CPC .................... *H04W 16/14* (2013.01)
(58) Field of Classification Search
CPC ..... H04B 17/318; H04B 1/719; H04W 4/029; H04W 4/021; H04W 4/33; H04W 52/243;
(Continued)

(56) References Cited

U.S. PATENT DOCUMENTS

| 5,548,805 | A | 8/1996 | Shpantzer et al. |
| 2006/0171445 | A1* | 8/2006 | Batra ..................... H04B 1/719 375/130 |

(Continued)

FOREIGN PATENT DOCUMENTS

| WO | WO-2016049348 A1 | 3/2016 |
| WO | WO-2017034081 A1 | 3/2017 |
| WO | WO-2019125433 A1 | 6/2019 |

OTHER PUBLICATIONS

"Indian Application Serial No. 202047010856, Voluntary Amendment filed Jun. 23, 2021", 13 pgs.

(Continued)

*Primary Examiner* — Dai Phuong
(74) *Attorney, Agent, or Firm* — Schwegman Lundberg & Woessner, P.A.

(57) ABSTRACT

Methods, apparatus, and computer-readable media are described for notching a 6 GHz channel. A station associates with an access point on a 6 GHz band. A notching pattern indication is decoded from data received from the AP after associating with the AP. A notching region within a channel within the 6 GHz band is determined based on the notching pattern indication. The notching pattern indicates a width of a notching region and a location of the notching region within the channel. The notching region covers bandwidth occupied by an incumbent system within the channel. A physical layer convergence procedure (PLCP) protocol data unit (PPDU) is encoded for transmission on the channel to the AP. The PPDU is encoded to exclude transmission within the notching region.

22 Claims, 12 Drawing Sheets

(58) Field of Classification Search
CPC .......... G06K 19/0705; H04M 1/72519; H04L 27/2647
See application file for complete search history.

(56) References Cited

U.S. PATENT DOCUMENTS

| | | | | |
|---|---|---|---|---|
| 2007/0111682 A1* | 5/2007 | Mucke | ................. | H04B 1/0475 455/127.1 |
| 2013/0225101 A1* | 8/2013 | Basaran | ................... | H03H 7/12 455/79 |
| 2017/0070914 A1* | 3/2017 | Chun | .................... | H04L 5/0053 |
| 2017/0332277 A1 | 11/2017 | Xin et al. | | |
| 2018/0083819 A1* | 3/2018 | Rubin | ................. | H04L 27/2623 |

OTHER PUBLICATIONS

"Indian Application Serial No. 202047010856, First Examination Report dated Aug. 31, 2021", 7 pgs.
"International Application Serial No. PCT/US2017/067593, International Preliminary Report on Patentability dated Jul. 2, 2020", 10 pgs.
"International Application Serial No. PCT/US2017/067593, International Search Report dated Nov. 28, 2018", 3 pgs.
"International Application Serial No. PCT/US2017/067593, Written Opinion dated Nov. 28, 2018", 8 pgs.
Trainin, Solomon, et al., "Occupied bandwidth clarification", IEEE 802, (Mar. 15, 2017), 11-17 pgs.

\* cited by examiner

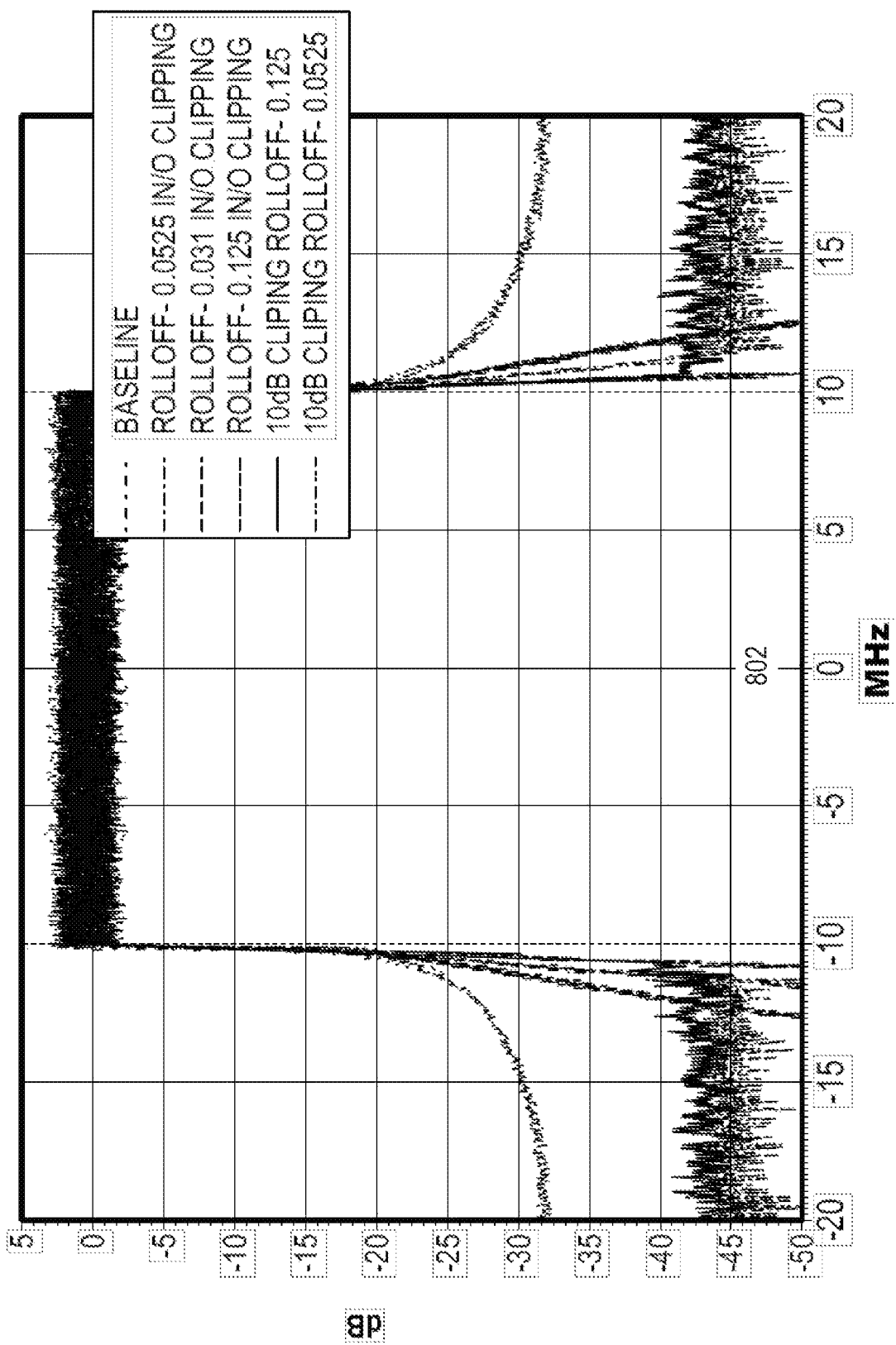

US 11,310,671 B2

RESOURCE UNIT NOTCHING FOR INCUMBENT PROTECTION IN THE 6GHZ BAND FOR NEXT-GENERATION WI-FI

This application is a U.S. National Stage Filing under 35 U.S.C. 371 from International Application No. PCT/US2017/067593, filed Dec. 20, 2017 and published in English as WO 2019/125433 on Jun. 27, 2019, which is incorporated herein by reference in its entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to IEEE 802.1 lax. Some embodiments relate to methods, computer readable media, and apparatus for notching bandwidth to avoid interference with incumbent systems.

BACKGROUND

Next generation Wi-Fi may have the option to operate in the 6-7 GHz band and will share this band with incumbent services. For example, fixed point-to-point backhaul for carriers, microwave communication for businesses, industry and public safety. Although the available bandwidth for Wi-Fi could be 160 MHz or even 320 MHz, quite a few incumbent services may interfere with the Wi-Fi operation or vice versa.

BRIEF DESCRIPTION OF THE FIGURES

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

FIGS. 8A-8B illustrate out-of-bad emission with transmit windowing according with some embodiments.

DESCRIPTION

Currently in 802.11af STAs operate in lower bands, 2.4/5 GHz. The unlicensed band between 6 GHz and 7 GHz may be open for STA operation. To avoid interfering with incumbent systems, Wi-Fi operation may be turned off in the band that overlap with incumbent systems. Described herein are methods, systems, etc., on how to notch a Wi-Fi signal to avoid overlapping with an incumbent system.

Figure 1:
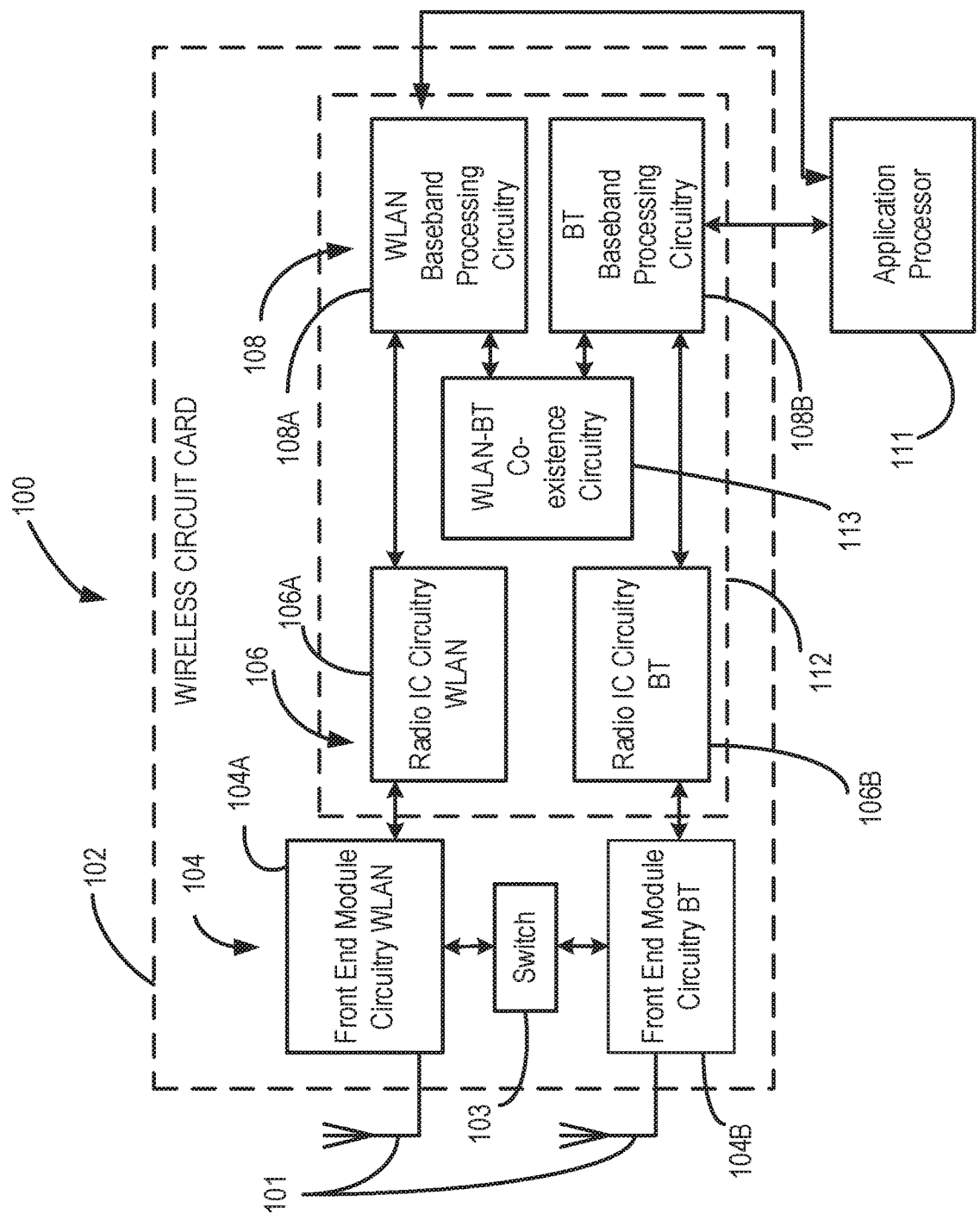
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11ac, and/or IEEE 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.11ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz)

(with non-contiguous bandwidths). In some embodiments, a 320 MHz channel bandwidth may be used. The scope of the embodiments is not limited with respect to the above center frequencies however.

Figure 2:
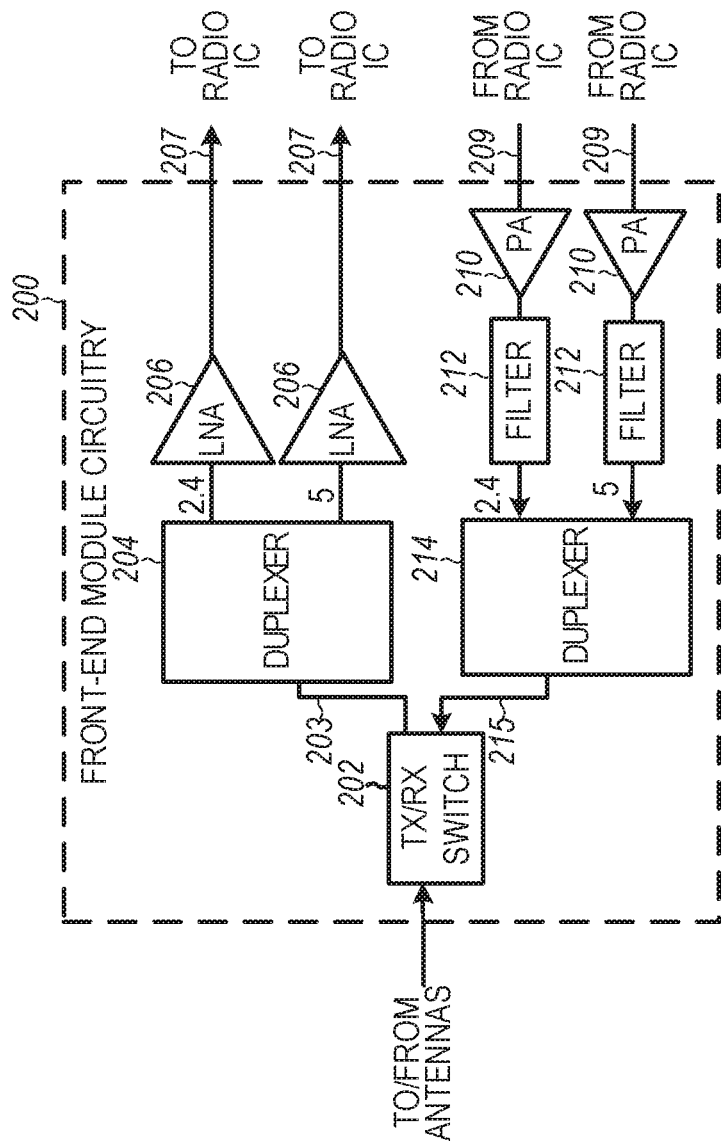
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
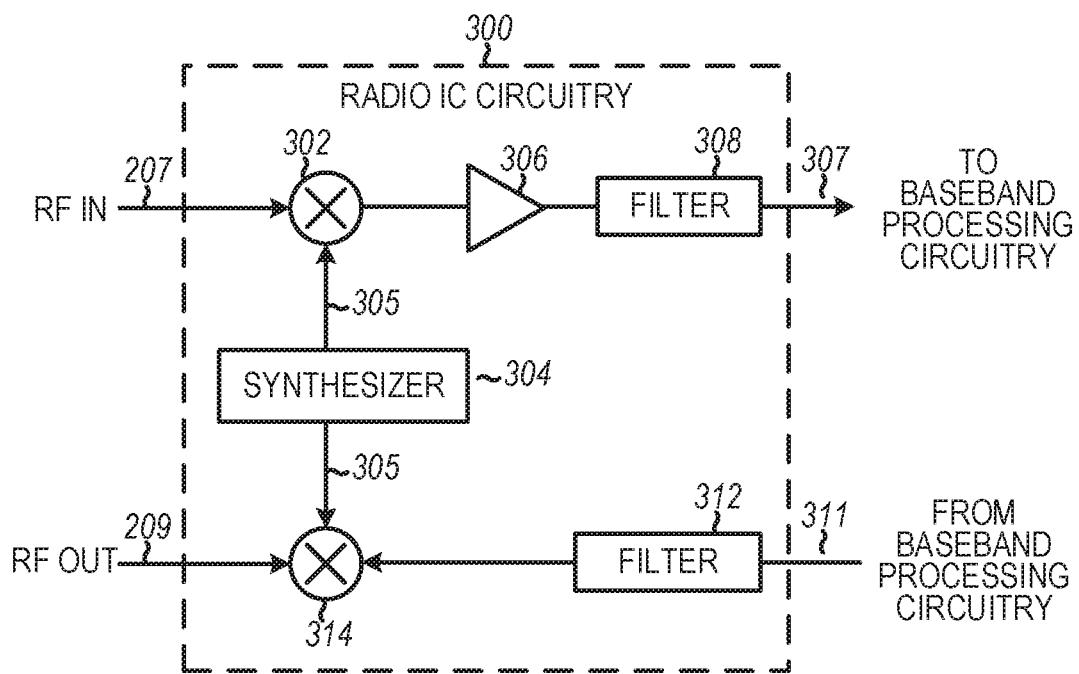
FIG. 3 illustrates a radio IC circuitry for use in the radio architecture of FIG. 1 in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
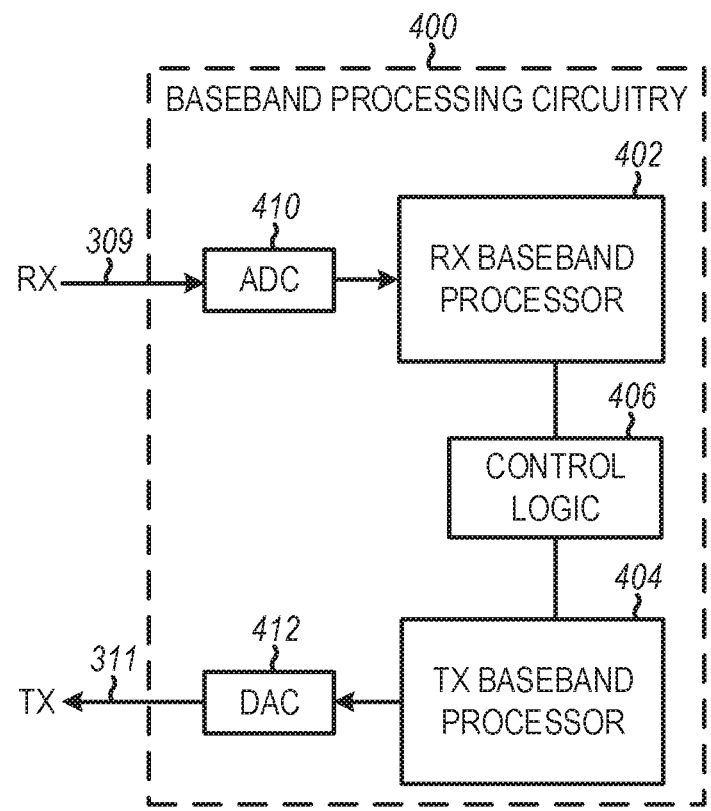
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
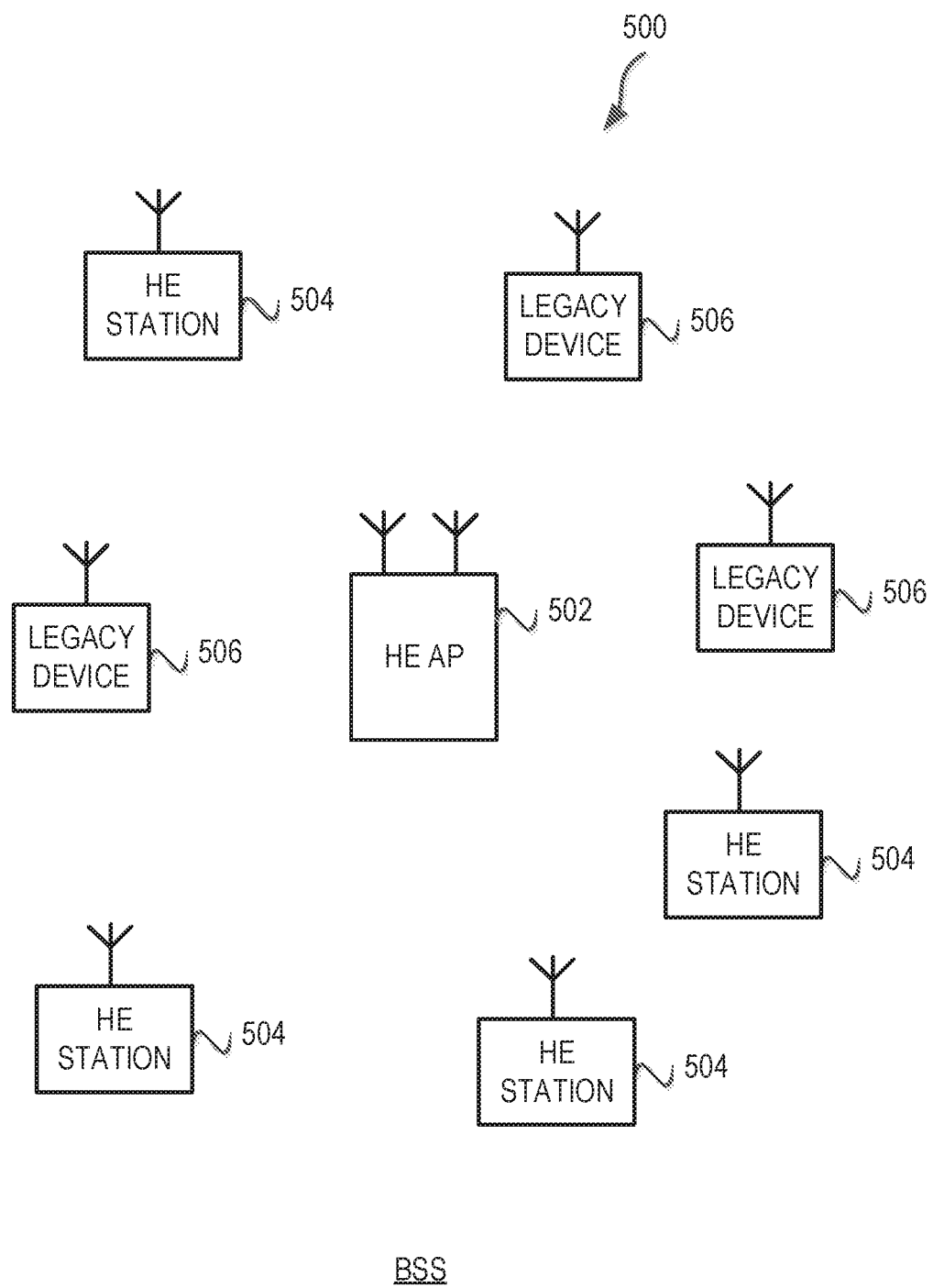
FIG. 5 illustrates a WLAN in accordance with some embodiments.

FIG. 5 illustrates a WLAN 500 in accordance with some embodiments. The WLAN 500 may comprise a basis service set (BSS) that may include a HE access point (AP) 502, which may be an AP, a plurality of high-efficiency wireless (e.g., IEEE 802.1 lax) (HE) stations 504, and a plurality of legacy (e.g., IEEE 802.11n/ac) devices 506.

The HE AP 502 may be an AP using the IEEE 802.11 to transmit and receive. The HE AP 502 may be a base station. The HE AP 502 may use other communications protocols as well as the IEEE 802.11 protocol. The IEEE 802.11 protocol may be IEEE 802.1 lax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one HE AP 502 that is part of an extended service set (ESS). A controller (not illustrated) may store information that is common to the more than one HE APs 502.

The legacy devices 506 may operate in accordance with one or more of IEEE 802.11 a/b/g/n/ac/ad/af/ah/aj/ay, or another legacy wireless communication standard. The legacy devices 506 may be stations (STAs) or IEEE STAs. The HE STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.1 lax or another wireless protocol. In some embodiments, the HE STAs 504 may be termed high efficiency (HE) stations.

The HE AP 502 may communicate with legacy devices 506 in accordance with legacy IEEE 802.11 communication techniques. In example embodiments, the HE AP 502 may also be configured to communicate with HE STAs 504 in accordance with legacy IEEE 802.11 communication techniques.

In some embodiments, a HE frame may be configurable to have the same bandwidth as a channel. The HE frame may be a physical Layer Convergence Procedure (PLCP) Protocol Data Unit (PPDU). In some embodiments, there may be different types of PPDUs that may have different fields and different physical layers and/or different media access control (MAC) layers.

The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments, the bandwidth of the channels may be based on a number of active data subcarriers. In some embodiments, the bandwidth of the channels is based on 26, 52, 106, 242, 484, 996, or 2×996 active data subcarriers or tones that are spaced by 20 MHz. In some embodiments, the bandwidth of the channels is 256 tones spaced by 20 MHz. In some embodiments, the channels are multiple of 26 tones or a multiple of 20 MHz. In some embodiments, a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz, 40 MHz, 80 MHz. 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A HE frame may be configured for transmitting a number of spatial streams, which may be in accordance with MU-MIMO and may be in accordance with OFDMA. In other embodiments, the HE AP 502, HE STA 504, and/or legacy device 506 may also implement different technologies such as code division multiple access (CDMA) 2000, CDMA 2000 1×, CDMA 2000 Evolution-Data Optimized (EV-DO), Interim Standard 2000 (IS-2000), Interim Standard 95 (IS-95), Interim Standard 856 (IS-856), Long Term Evolution (LTE). Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HE communications. In accordance with some IEEE 802.11 embodiments, e.g., IEEE 802.1 lax embodiments, a HE AP 502 may operate as a master station which may be arranged to contend for a wireless medium (e.g., during a contention period) to receive exclusive control of the medium for an HE control period. In some embodiments, the HE control period may be termed a transmission opportunity (TXOP). The HE AP 502 may transmit a HE master-sync transmission, which may be a trigger frame or HE control and schedule transmission, at the beginning of the HE control period. The HE AP 502 may transmit a time duration of the TXOP and sub-channel information. During the HE control period, HE STAs 504 may communicate with the HE AP 502 in accordance with a non-contention based multiple access technique such as OFDMA or MU-MIMO. This is unlike conventional WLAN communications in which devices communicate in accordance with a contention-based communication technique, rather than a multiple access technique. During the HE control period, the HE AP 502 may communicate with HE stations 504 using one or more HE frames. During the HE control period, the HE STAs 504 may operate on a sub-channel smaller than the operating range of the HE AP 502. During the HE control period, legacy stations refrain from communicating. The legacy stations may need to receive the communication from the HE AP 502 to defer from communicating.

In accordance with some embodiments, during the TXOP the HE STAs 504 may contend for the wireless medium with the legacy devices 506 being excluded from contending for the wireless medium during the master-sync transmission. In some embodiments, the trigger frame may indicate an uplink (UL) UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the HE TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The HE AP 502 may also communicate with legacy stations 506 and/or HE stations 504 in accordance with legacy IEEE 802.11 communication techniques. In some embodiments, the HE AP 502 may also be configurable to communicate with HE stations 504 outside the HE TXOP in accordance with legacy IEEE 802.11 communication techniques, although this is not a requirement.

In some embodiments, the HE station 504 may be a "group owner" (GO) for peer-to-peer modes of operation. A wireless device may be a HE station 502 or a HE AP 502.

In some embodiments, the HE station 504 and/or HE AP 502 may be configured to operate in accordance with IEEE 802.11 mc. In example embodiments, the radio architecture of FIG. 1 is configured to implement the HE station 504 and/or the HE AP 502. In example embodiments, the front-end module circuitry of FIG. 2 is configured to implement the HE station 504 and/or the HE AP 502. In example embodiments, the radio IC circuitry of FIG. 3 is configured to implement the HE station 504 and/or the HE AP 502. In example embodiments, the base-band processing circuitry of FIG. 4 is configured to implement the HE station 504 and/or the HE AP 502.

In example embodiments, the HE stations 504, HE AP 502, an apparatus of the HE stations 504, and/or an apparatus of the HE AP 502 may include one or more of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuitry of FIG. 2, the radio IC circuitry of FIG. 3, and/or the base-band processing circuitry of FIG. 4 may be configured to perform the methods and operations/functions herein described in conjunction with FIGS. 1-10.

In example embodiments, the HE station 504 and/or the HE AP 502 are configured to perform the methods and operations/functions described herein in conjunction with FIGS. 1-10. In example embodiments, an apparatus of the HE station 504 and/or an apparatus of the HE AP 502 are configured to perform the methods and functions described herein in conjunction with FIGS. 1-10. The term Wi-Fi may refer to one or more of the IEEE 802.11 communication standards. AP and STA may refer to HE access point 502 and/or HE station 504 as well as legacy devices 506.

In some embodiments, a HE AP 502 or a HE STA 504 performing at least some functions of an HE AP 502 may be referred to as HE AP STA. In some embodiments, a HE STA 504 may be referred to as a HE non-AP STA. In some embodiments, a HE STA 504 may be referred to as either a HE AP STA and/or HE non-AP.

Figure 6:
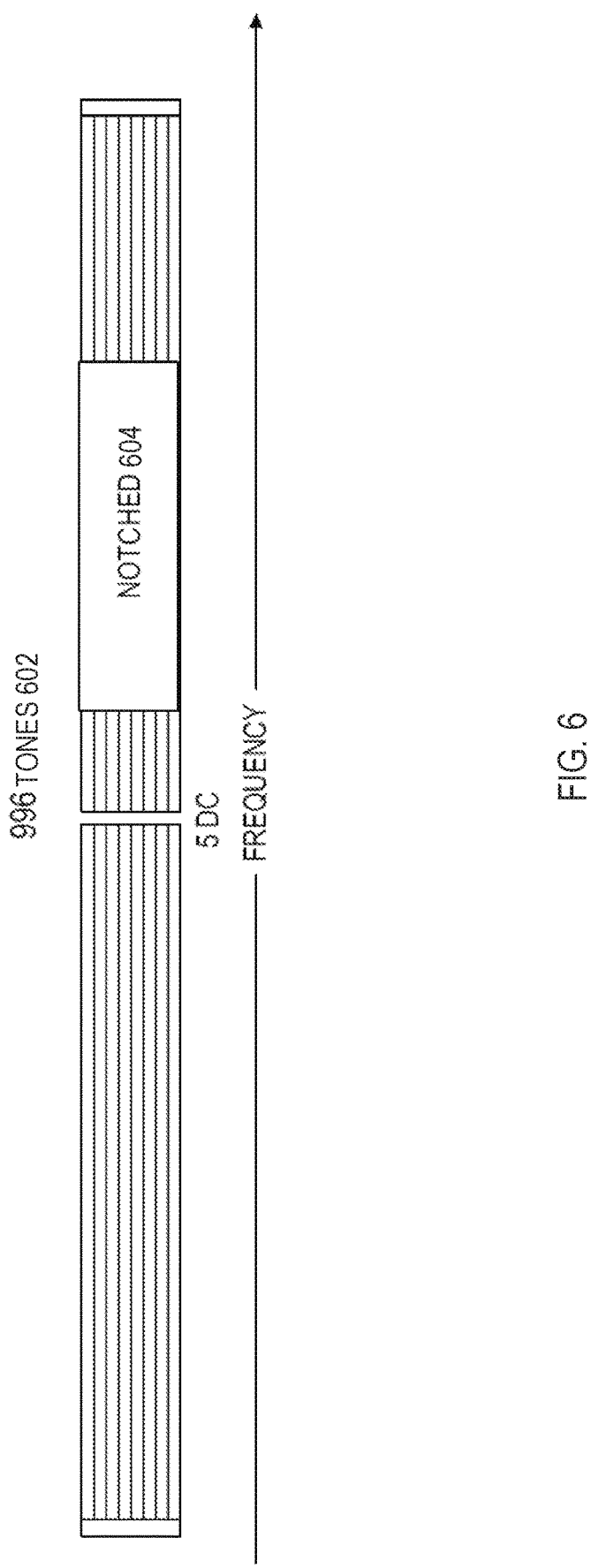
FIG. 6 illustrates an example of notching in a physical layer convergence procedure (PLCP) protocol data unit (PPDU) in accordance with some embodiments.

FIG. 6 illustrates an example of notching in a physical layer convergence procedure (PLCP) protocol data unit (PPDU) in accordance with some embodiments. FIG. 6 illustrates an 80 MHz channel with 996 tones 602. An incumbent system operates within a portion frequency within the 80 MHz channel that lies within a notched region 604. The notched region 604 is determined based on the resources used by the incumbent system. The transmission of the PPDU may use the bandwidth outside of the notched region 604, therefore, eliminating any interference from the PPDU transmission with the incumbent system. Within the notched region, the PPDU transmission is extremely low or zero. Extremely low refers to an energy level that does not interfere with the incumbent system.

Figure 7:
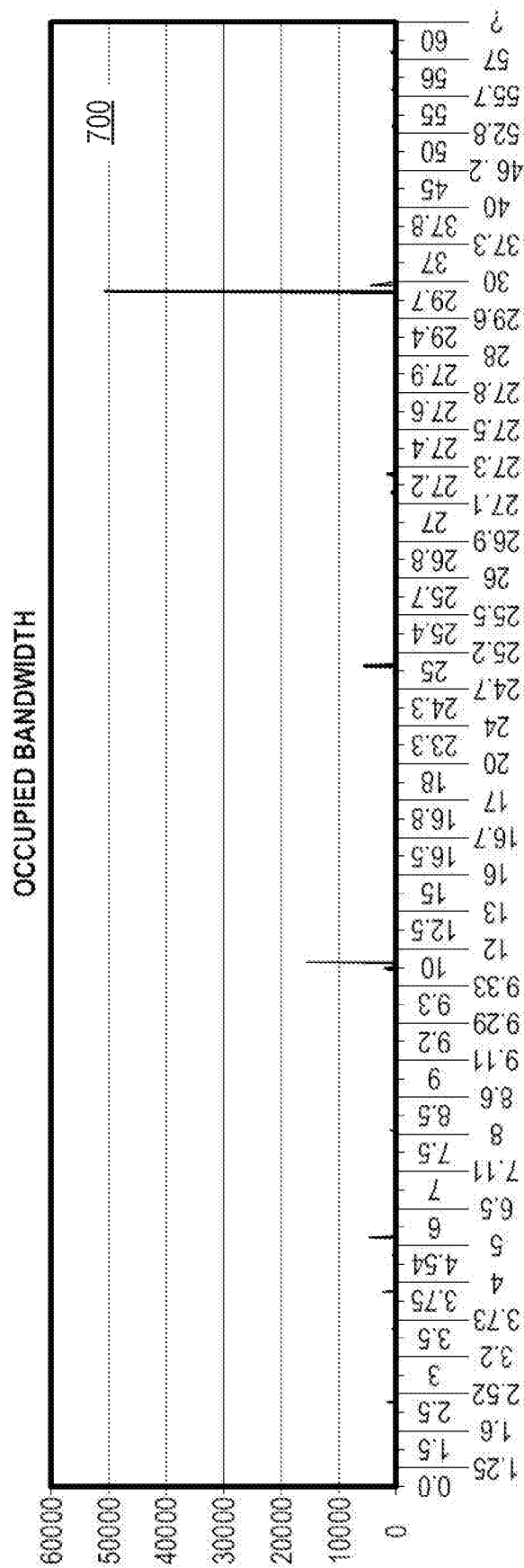
FIG. 7 illustrates an example distribution of incumbent services according with some embodiments.

FIG. 7 illustrates an example distribution of incumbent services according with some embodiments. FIG. 7 shows a histogram 700 and the percentage of the bandwidth distribution of incumbent services. In this example, 70% of the incumbent systems use bandwidth larger than 10 MHz, and 10% incumbents are narrow band (<=5 MHz). Table 1 below shows the bandwidth used by the incumbent systems from the histogram 700 of FIG. 7.

TABLE 1

| BW | <=5 Mhz | 5-10 MHz | 10-25 MHz | >25 MHz |
|---|---|---|---|---|
| Percentage | 10% | 20% | 8% | 62% |

The bandwidth used by the incumbent systems may be used to determine the notching pattern that a Wi-Fi transmitter uses to avoid interfering with the incumbent systems. For single-user (SU) PPDU notching, the incumbent bandwidth distribution in FIG. 7 may be considered. Most of the incumbent system use larger bandwidth. In an example, there may be three notching granularities: 10 MHz, 20 MHz and 30 MHz. The 10 MHz is used to cover the incumbent bellow 10 MHz; and 20 MHz is used to cover the incumbents that have bandwidth between 15 and 20 MHz; and 30 MHz is used to cover the rest notching bandwidth.

Figure 8B:
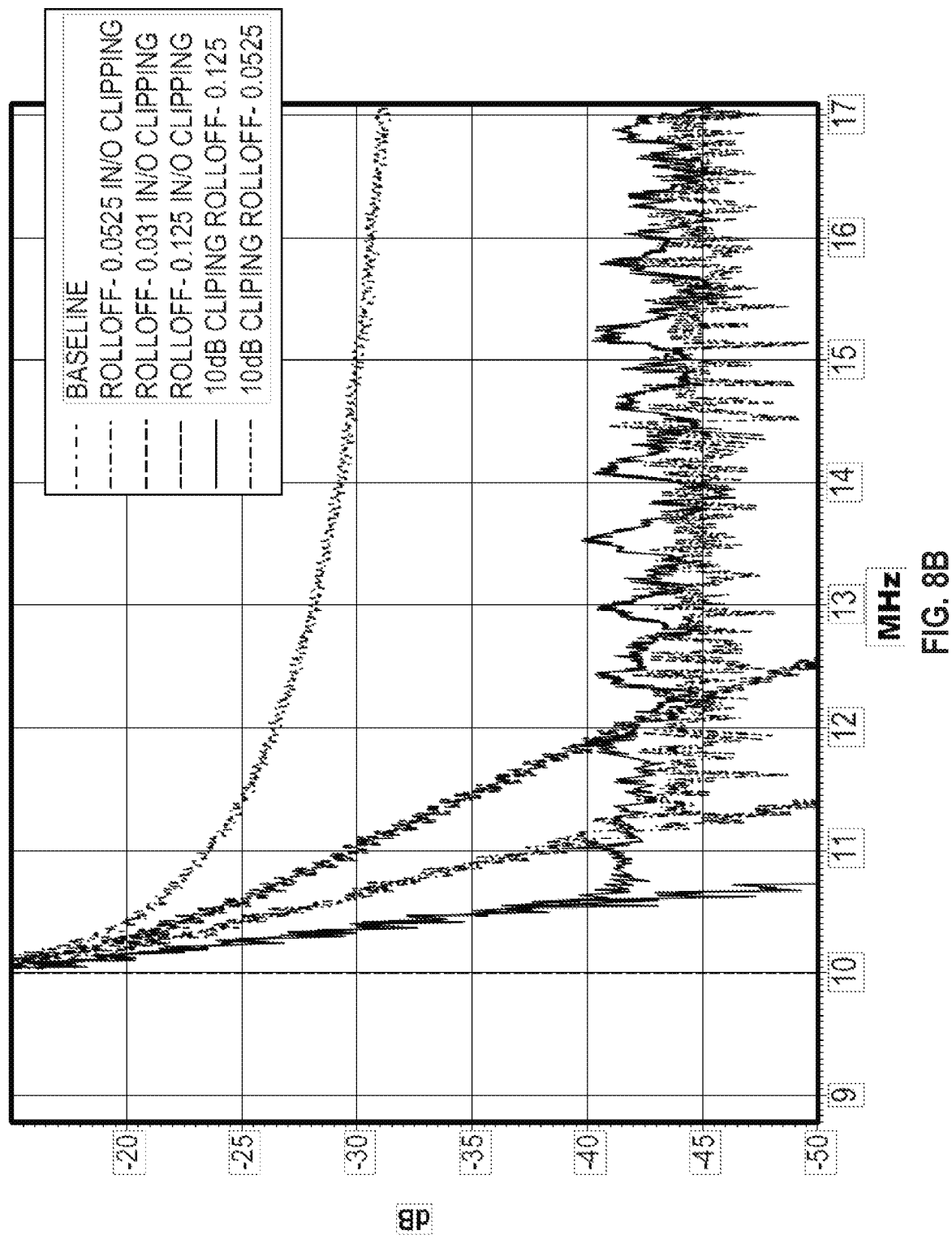

Evaluating a transmitter's ability to notch at a particular frequency showed that a guard band may be used to further protect an incumbent system FIGS. 8A-8B illustrate out-of-bad emission with transmit windowing according with some embodiments. FIG. 8A illustrates a 20 MHz notch centered at 0 MHz 802 in the graph. FIG. 8B shows a zoomed in portion of FIG. 8A at the 10 MHz position. Note that from the evaluation results shown in FIGS. 8A-8B, a 1 MHz guard band may be used to protect incumbent systems.

Comparing with the RU size defined in 11ax (26/52/106/242/484/996 tone RU), after notching anew RU size for SU PPDU (with 10/20/30 MHz notching granularity) is 106+484=590 tone (30 MHz notching), 242*3+106=832 tone (10 MHz notching) and 242*3=726 tone (20 Mhz notching). This example notching does not increase the number of new modes by much comparing with 11ax.

Figure 9:
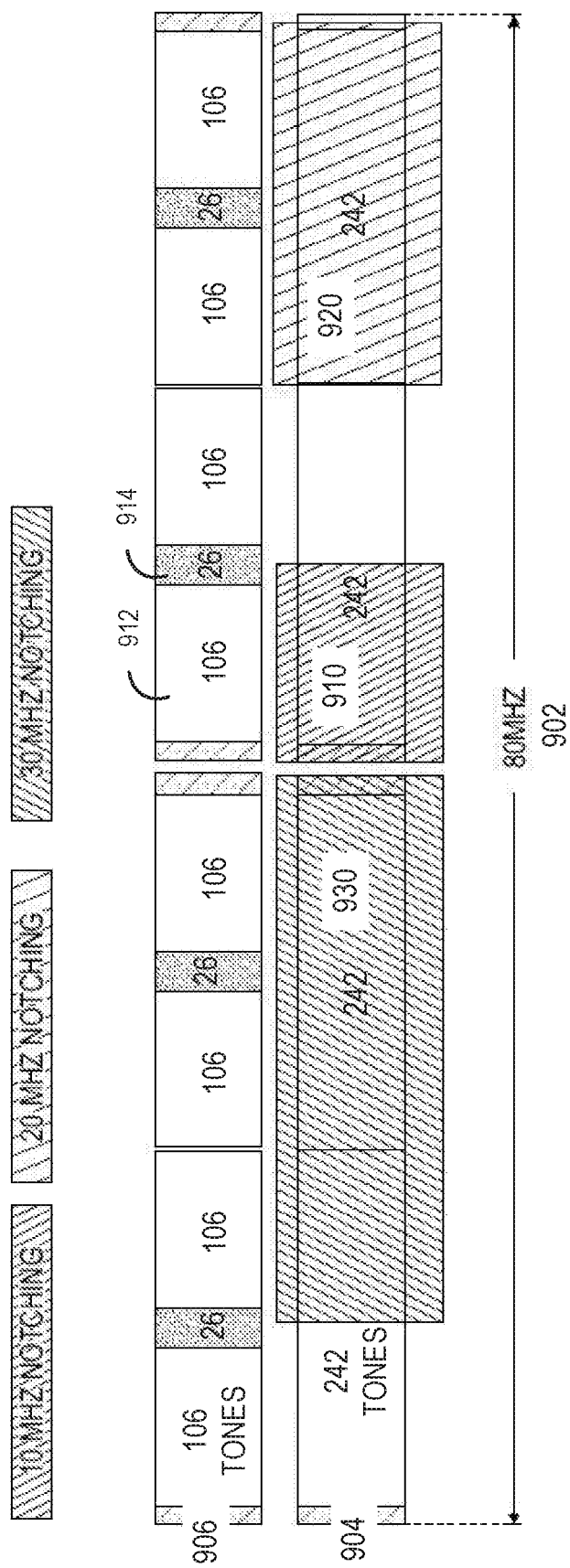
FIG. 9 illustrates notching for a single-user PPDU according with some embodiments.

FIG. 9 illustrates notching for a single-user PPDU according with some embodiments. In the example in FIG. 9, there is an 80 MHz channel 902 that shows example ways the channel may be notched using different notching granularities. The 80 MHz channel 902 may include RUs made up of a different number of tones. For example, the channel 902 may be made up of two groups of 484 tones 904 or may be split up differently 906. Using 10 MHz notching 910, a group of 132 tones are notched. The notched tones include the 106 tones 912 and the 26 tones RU 914. Using the 10 MHz notching 910 provides an RU for this 80 MHz channel that includes 832 tones. If 20 MHz notching 920 is used, 238 total tones are notched leaving 726 tones. If 30 MHz notching 930 is used, 344 tones are notched leaving 726 tones for the RU. In this example, when a notch partially overlaps DC tones, such as DC tones 914, the entire group of tones are notched.

Figure 10:
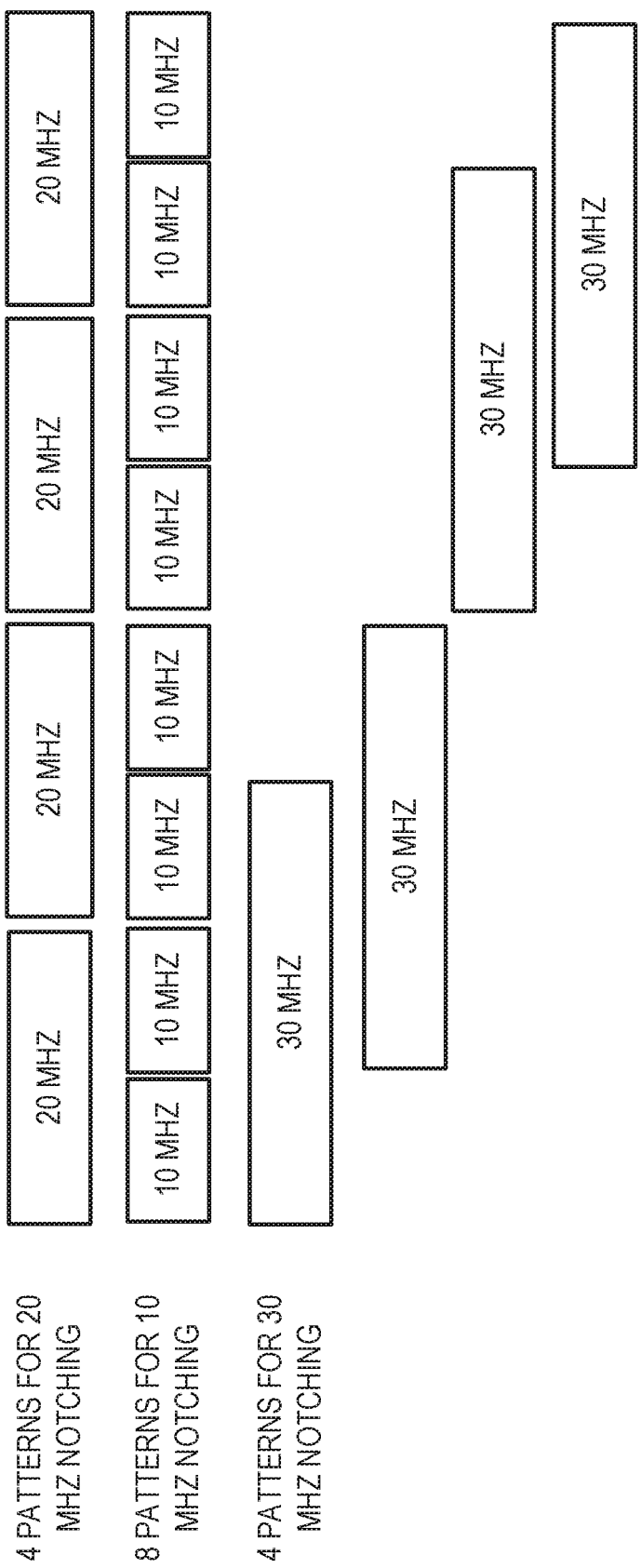
FIG. 10 illustrates example notching patterns according with some embodiments.

All of the notching patterns for 10/20/30 MHz are summarized in FIG. 10. Once a station associates with an access point, the access point may indicate which notching pattern is used for a particular channel. In an example, for Wi-Fi there is only one incumbent system, such that a single notch may be used. In FIG. 10, there are sixteen patterns in total for each 80 MHz which could be signaled by four bits. The notching pattern bits may be signaled in either a MAC header or a PHY header. For 320 MHz and 160 MHz channels, 16 bits and 8 bits respectively would be used. In other examples, multiple notching patterns may be specified. For example, eight bits may be used to indicate two notching patterns for an 80 MHz channel. In an example, larger notching patterns may be chosen to cover multiple incumbent systems.

The notching patterns shown in FIG. 10 are not the only notching patterns that may be used. The number of notching patterns, i.e., the notching granularity, is a tradeoff between notching flexibility and new RU sizes after notching. Another way to choose the granularity is to enable muting any one of the 11ax RU sizes. This means each individual 26/52/106/242/484/996 tone RU could be notched. This alternative provides maximum flexibility on notching but also creates a number of new RU sizes. In this example, the resource allocation signaling in HE-SIGB for MU PPDU may be reused to indicate which RU is notched. In 11ax, the RA signaling in HE-SIGB is used to indicate a specific RU is allocated to a client. The HE-SIGN signaling may be repurposed to indicate which RU is notched (instead of allocated) for a client. In this example, eight bits are needed for each 80 MHz channel if only one incumbent overlaps with Wi-Fi.

For a multi-user (MU) PPDU transmission, which is scheduled by AP, resource allocation signaling, e.g., HE-SIG-B in 11ax, may be used allocate any RU sized defined in the specification. Accordingly, zero energy may be allocated to the specific RU(s) that overlaps with an incumbent system. In an example, the AP would not allocate any client in the RU that may bring interference to the incumbent. As an example, an incumbent system is overlapped with a rightmost 242 tone RU in an 80 MHz channel. The AP just schedules the clients in any RUs other than the right most RU, leaving the right most RU unallocated to any client. MU PPDU notching, therefore, could be realized by an AP's resource allocation. To achieve notching, the AP could use the resource allocation signaling to reserve the vacant RUs for the incumbent system.

Figure 11:
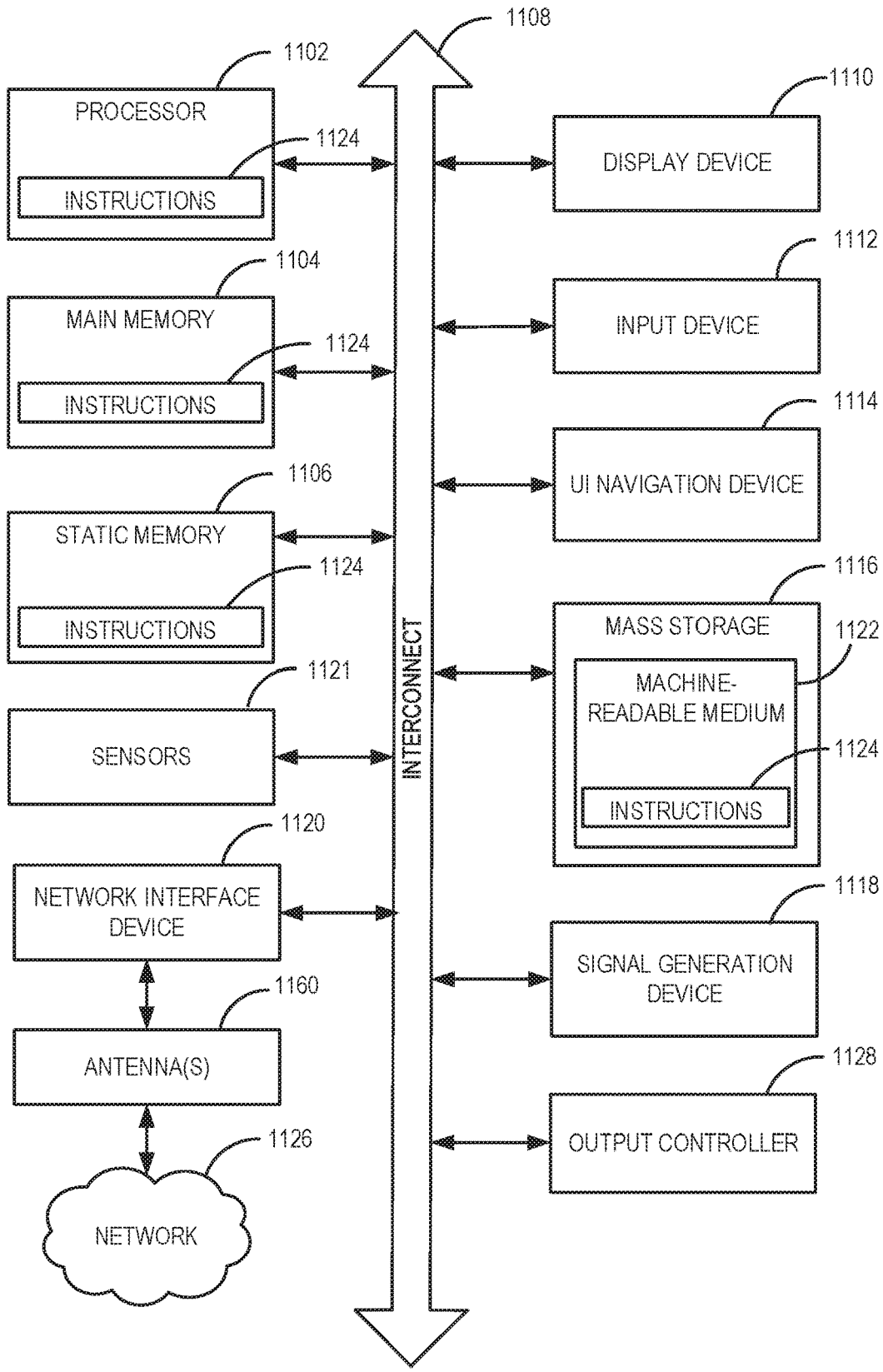
FIG. 11 illustrates a block diagram of an example machine upon which any one or more of the techniques (e.g., methodologies) discussed herein may perform.

FIG. 11 illustrates a block diagram of an example machine 1100 upon which any one or more of the techniques (e.g., methodologies) discussed herein may perform. In alternative embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environment. The machine 1100 may be a HE AP 502, HE station 504, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 1100 may include a hardware processor 1102 (e.g., a central processing unit (CPU), a graphics processing unit (GPU), a hardware processor core, or any combination thereof), a main memory 1104 and a static memory 1106, some or all of which may communicate with each other via an interlink (e.g., bus) 1108.

Specific examples of main memory 1104 include Random Access Memory (RAM), and semiconductor memory devices, which may include, in some embodiments, storage locations in semiconductors such as registers. Specific examples of static memory 1106 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 1100 may further include a display device 1110, an input device 1112 (e.g., a keyboard), and a user interface (UI) navigation device 1114 (e.g., a mouse). In an example, the display device 1110, input device 1112 and UI navigation device 1114 may be a touch screen display. The machine 1100 may additionally include a mass storage (e.g., drive unit) 1116, a signal generation device 1118 (e.g., a speaker), a network interface device 1120, and one or more sensors 1121, such as a global positioning system (GPS) sensor, compass, accelerometer, or other sensor. The machine 1100 may include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 1102 and/or instructions 1124 may comprise processing circuitry and/or transceiver circuitry.

The storage device 1116 may include a machine readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within static memory 1106, or within the hardware processor 1102 during execution thereof by the machine 1100. In an example, one or any combination of the hardware processor 1102, the main memory 1104, the static memory 1106, or the storage device 1116 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 1122 is illustrated as a single medium, the term "machine readable medium" may include a single medium or multiple media (e.g., a centralized or distributed database, and/or associated caches and servers) configured to store the one or more instructions 1124.

An apparatus of the machine 1100 may be one or more of a hardware processor 1102 (e.g., a central processing unit (CPU), a graphics processing unit (GPU), a hardware processor core, or any combination thereof), a main memory 1104 and a static memory 1106, sensors 1121, network interface device 1120, antennas 1160, a display device 1110, an input device 1112, a UI navigation device 1114, a mass storage 1116, instructions 1124, a signal generation device 1118, and an output controller 1128. The apparatus may be configured to perform one or more of the methods and/or operations disclosed herein. The apparatus may be intended as a component of the machine 1100 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 1100 and that cause the machine 1100 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices: magnetic disks, such as internal hard disks and removable disks; magneto-optical disks; Random Access Memory (RAM); and CD-ROM and DVD-ROM disks. In some examples, machine readable media may include non-transitory machine-readable media. In some examples, machine readable media may include machine readable media that is not a transitory propagating signal.

The instructions 1124 may further be transmitted or received over a communications network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 1120 may include one or more physical jacks (e.g., Ethernet, coaxial, or phone jacks) or one or more antennas to connect to the communications network 1126. In an example, the network interface device 1120 may include one or more antennas 1160 to wirelessly communicate using at least one of single-input multiple-output (SIMO), multiple-input multiple-output (MIMO), or multiple-input single-output (MISO) techniques. In some examples, the network interface device 1120 may wirelessly communicate using Multiple User MIMO techniques. The term "transmission medium" shall be taken to include any intangible medium that is capable of storing, encoding or carrying instructions for execution by the machine 1100, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM): magnetic disk storage media; optical storage media: flash memory, etc.

Figure 12:
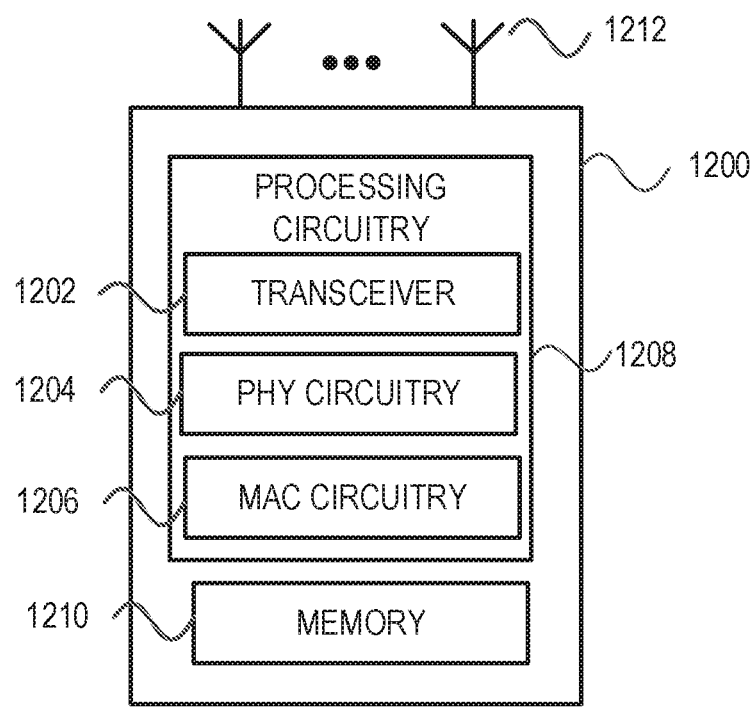
FIG. 12 illustrates a block diagram of an example wireless device upon which any one or more of the techniques (e.g., methodologies or operations) discussed herein may perform.

FIG. 12 illustrates a block diagram of an example wireless device 1200 upon which any one or more of the techniques (e.g., methodologies or operations) discussed herein may perform. The wireless device 1200 may be a HE device. The wireless device 1200 may be a HE STA 504 and/or HE AP 502 (e.g., FIG. 5). A HE STA 504 and/or HE AP 502 may include some or all of the components shown in FIGS. 1-5, 11, and 12. The wireless device 1200 may be an example machine 1100 as disclosed in conjunction with FIG. 11.

The wireless device 1200 may include processing circuitry 1208. The processing circuitry 1208 may include a transceiver 1202, physical layer circuitry (PHY circuitry) 1204, and MAC layer circuitry (MAC circuitry) 1206, one or more of which may enable transmission and reception of signals to and from other wireless devices 1200 (e.g., HE AP 502, HE STA 504, and/or legacy devices 506) using one or more antennas 1212. As an example, the PHY circuitry 1204 may perform various encoding and decoding functions that may include formation of baseband signals for transmission and decoding of received signals. As another example, the transceiver 1202 may perform various transmission and reception functions such as conversion of signals between a baseband range and a Radio Frequency (RF) range.

Accordingly, the PHY circuitry 1204 and the transceiver 1202 may be separate components or may be part of a combined component, e.g., processing circuitry 1208. In addition, some of the described functionality related to transmission and reception of signals may be performed by a combination that may include one, any or all of the PHY circuitry 1204 the transceiver 1202, MAC circuitry 1206, memory 1210, and other components or layers. The MAC circuitry 1206 may control access to the wireless medium. The wireless device 1200 may also include memory 1210 arranged to perform the operations described herein, e.g., some of the operations described herein may be performed by instructions stored in the memory 1210.

The antennas 1212 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 1212 may be effectively separated to take advantage of spatial diversity and the different channel characteristics that may result.

One or more of the memory 1210, the transceiver 1202, the PHY circuitry 1204, the MAC circuitry 1206, the antennas 1212, and/or the processing circuitry 1208 may be coupled with one another. Moreover, although memory 1210, the transceiver 1202, the PHY circuitry 1204, the MAC circuitry 1206, the antennas 1212 are illustrated as separate components, one or more of memory 1210, the transceiver 1202, the PHY circuitry 1204, the MAC circuitry 1206, the antennas 1212 may be integrated in an electronic package or chip.

In some embodiments, the wireless device 1200 may be a mobile device as described in conjunction with FIG. 11. In some embodiments, the wireless device 1200 may be configured to operate in accordance with one or more wireless communication standards as described herein (e.g., as described in conjunction with FIGS. 1-5 and 11, IEEE 802.11). In some embodiments, the wireless device 1200 may include one or more of the components as described in conjunction with FIG. 11 (e.g., display device 1110, input device 1112, etc.) Although the wireless device 1200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 1200 may include various components of the wireless device 1200 as shown in FIG. 12 and/or components from FIGS. 1-5 and 11. Accordingly, techniques and operations described herein that refer to the wireless device 1200 may be applicable to an apparatus for a wireless device 1200 (e.g., HE AP 502 and/or HE STA 504), in some embodiments. In some embodiments, the wireless device 1200 is configured to decode and/or encode signals, packets, and/or frames as described herein, e.g., PPDUs.

In some embodiments, the MAC circuitry 1206 may be arranged to contend for a wireless medium during a contention period to receive control of the medium for a HE TXOP and encode or decode a HE PPDU. In some embodiments, the MAC circuitry 1206 may be arranged to contend for the wireless medium based on channel contention settings, a transmitting power level, and a clear channel assessment level (e.g., an energy detect level).

The PHY circuitry 1204 may be arranged to transmit signals in accordance with one or more communication standards described herein. For example, the PHY circuitry 1204 may be configured to transmit a HE PPDU. The PHY circuitry 1204 may include circuitry for modulation/demodulation, upconversion/downconversion, filtering, amplification, etc. In some embodiments, the processing circuitry 1208 may include one or more processors. The processing circuitry 1208 may be configured to perform functions based on instructions being stored in a RAM or ROM, or based on special purpose circuitry. The processing circuitry 1208 may include a processor such as a general-purpose processor or special purpose processor. The processing circuitry 1208 may implement one or more functions associated with antennas 1212, the transceiver 1202, the PHY circuitry 1204, the MAC circuitry 1206, and/or the memory 1210. In some embodiments, the processing circuitry 1208 may be configured to perform one or more of the functions/operations and/or methods described herein.

In mmWave technology, communication between a station (e.g., the HE stations 504 of FIG. 5 or wireless device 1200) and an access point (e.g., the HE AP 502 of FIG. 5 or wireless device 1200) may use associated effective wireless channels that are highly directionally dependent. To accommodate the directionality, beamforming techniques may be utilized to radiate energy in a certain direction with certain beamwidth to communicate between two devices. The directed propagation concentrates transmitted energy toward a target device in order to compensate for significant energy loss in the channel between the two communicating devices. Using directed transmission may extend the range of the millimeter-wave communication versus utilizing the same transmitted energy in omni-directional propagation.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media: flash memory, etc.

Additional Notes and Examples

Example 1 is an apparatus of a station (STA) configurable for 6 gigahertz (GHz) band operation, the apparatus comprising: memory; and processing circuitry, the processing circuitry configured to: associate with an access point (AP) on the 6 GHz band; decode a notching pattern indication from data received from the AP after associating with the AP; determine a notching region within a channel within the 6 GHz band based on the notching pattern indication, wherein the notching pattern indicates a width of a notching region and a location of the notching region within the channel; and encode a physical layer convergence procedure (PLCP) protocol data unit (PPDU) for transmission on the channel to the AP with no data encoded within the notching region.

In Example 2, the subject matter of Example 1 includes, wherein the memory is configured to store the notching pattern indication.

In Example 3, the subject matter of Examples 1-2 includes, wherein a medium access control layer header within the data comprises the notching pattern indication.

In Example 4, the subject matter of Examples 1-3 includes, wherein a physical layer header within the data comprises the notching pattern indication.

In Example 5, the subject matter of Examples 1-4 includes, wherein a high efficiency signal field (HE-SIGB) within the data comprises the notching pattern indication.

In Example 6, the subject matter of Examples 1-5 includes, wherein the channel is 80 MHz wide.

In Example 7, the subject matter of Example 6 includes, wherein the notching pattern indication comprises four bits.

In Example 8, the subject matter of Example 7 includes, wherein the width of the notching region is one of 10 MHz, 20 MHz, and 30 MHz.

In Example 9, the subject matter of Example 8 includes, wherein the PPDU comprises 590 tones, 726 tones, or 832 tones.

In Example 10, the subject matter of Examples 1-9 includes, wherein the channel is 160 MHz or 320 MHz wide.

In Example 11, the subject matter of Examples 1-10 includes, wherein the processing circuitry is a baseband processor.

In Example 12, the subject matter of Examples 1-11 includes, one or more antennas; and a transceiver coupled to the one or more antennas, the transceiver configured to receive 6 GHz signals and transmit 6 GHz signals.

Example 13 is a method performed by processing circuitry of station (STA) configured for a six GHz operation, the method comprising: associating with an access point (AP) on the 6 GHz band: decoding a notching pattern indication from data received from the AP after associating with the AP; determining a notching region within a channel within the 6 GHz band based on the notching pattern indication, wherein the notching pattern indicates a width of a notching region and a location of the notching region within the channel; and encoding a physical layer convergence procedure (PLCP) protocol data unit (PPDU) for transmission on the channel to the AP with no data encoded within the notching region.

In Example 14, the subject matter of Example 13 includes, wherein a medium access control layer header within the data comprises the notching pattern indication.

In Example 15, the subject matter of Examples 13-14 includes, wherein a physical layer header within the data comprises the notching pattern indication.

In Example 16, the subject matter of Examples 13-15 includes, wherein a high efficiency signal field (HE-SIGB) comprises the notching pattern indication.

In Example 17, the subject matter of Examples 13-16 includes, wherein the channel is 80 MHz wide.

In Example 18, the subject matter of Example 17 includes, wherein the notching pattern indication comprises four bits.

In Example 19, the subject matter of Example 18 includes, wherein the width of the notching region is one of 10 MHz, 20 MHz, and 30 MHz.

In Example 20, the subject matter of Example 19 includes, wherein the PPDU comprises 590 tones, 726 tones, or 832 tones.

In Example 21, the subject matter of Examples 13-20 includes, wherein the channel is 160 MHz wide.

In Example 22, the subject matter of Example 21 includes, wherein the notching pattern indication comprises eight bits.

In Example 23, the subject matter of Examples 13-22 includes, wherein the channel is 320 MHz wide.

In Example 24, the subject matter of Example 23 includes, wherein the notching pattern indication comprises sixteen bits.

Example 25 is at least one computer-readable medium comprising instructions which when executed by processing circuitry of a station (STA) for six GHz operation, cause the STA to perform operations: associating with an access point (AP) on the 6 GHz band; decoding a notching pattern indication from data received from the AP after associating with the AP; determining a notching region within a channel within the 6 GHz band based on the notching pattern indication, wherein the notching pattern indicates a width of a notching region and a location of the notching region within the channel: and encoding a physical layer convergence procedure (PLCP) protocol data unit (PPDU) for transmission on the channel to the AP with no data encoded within the notching region.

In Example 26, the subject matter of Example 25 includes, wherein a medium access control layer header within the data comprises the notching pattern indication.

In Example 27, the subject matter of Examples 25-26 includes, wherein a physical layer header within the data comprises the notching pattern indication.

In Example 28, the subject matter of Examples 25-27 includes, wherein a high efficiency signal field (HE-SIGB) comprises the notching pattern indication.

In Example 29, the subject matter of Examples 25-28 includes, wherein the channel is 80 MHz wide.

In Example 30, the subject matter of Example 29 includes, wherein the notching pattern indication comprises four bits.

In Example 31, the subject matter of Example 30 includes, wherein the width of the notching region is one of 10 MHz, 20 MHz, and 30 MHz.

In Example 32, the subject matter of Example 31 includes, wherein the PPDU comprises 590 tones, 726 tones, or 832 tones.

In Example 33, the subject matter of Examples 25-32 includes, whereined the channel is 160 MHz wide.

In Example 34, the subject matter of Example 33 includes, wherein the notching pattern indication comprises eight bits.

In Example 35, the subject matter of Examples 25-34 includes, wherein the channel is 320 MHz wide.

In Example 36, the subject matter of Example 35 includes, wherein the notching pattern indication comprises sixteen bits.

Example 37 is an apparatus for an access point (AP) for 6 gigahertz (GHz) operation, the apparatus comprising: memory: and processing circuitry configured to: associate a station (STA) with the access point (AP) on the 6 GHz band; determine bandwidth used by an incumbent system within a 6 GHz channel; determine a notching region that covers the bandwidth used by the incumbent system; encode a notching pattern indication, within data, that indicates the notching region for transmission to the STA; and decode a physical layer convergence procedure (PLCP) protocol data unit (PPDU) from the STA on the 6 GHz channel with no data encoded within the notching region.

In Example 38, the subject matter of Example 37 includes, wherein the memory is configured to store the notching pattern indication.

In Example 39, the subject matter of Examples 37-38 includes, wherein a medium access control layer header within the data comprises the notching pattern indication.

In Example 40, the subject matter of Examples 37-39 includes, wherein a physical layer header within the data comprises the notching pattern indication.

In Example 41, the subject matter of Examples 37-40 includes, wherein a high efficiency signal field (HE-SIGB) within the data comprises the notching pattern indication.

In Example 42, the subject matter of Examples 37-41 includes, wherein the channel is 80 MHz wide.

In Example 43, the subject matter of Example 42 includes, wherein the notching pattern indication comprises four bits.

In Example 44, the subject matter of Example 43 includes, wherein the width of the notching region is one of 10 MHz, 20 MHz, and 30 MHz.

In Example 45, the subject matter of Example 44 includes, wherein the PPDU comprises 590 tones, 726 tones, or 832 tones.

In Example 46, the subject matter of Examples 37-45 includes, wherein the channel is 160 MHz or 320 MHz wide.

In Example 47, the subject matter of Examples 37-46 includes, one or more antennas; and a transceiver coupled to the one or more antennas, the transceiver configured to receive 6 GHz signals and transmit 6 GHz signals.

Example 48 is at least one machine-readable medium including instructions, which when executed by a machine, cause the machine to perform operations of any of the operations of Examples 13-24.

Example 49 is an apparatus comprising means for performing any of the operations of Examples 13-24.

Example 50 is at least one machine-readable medium including instructions that, when executed by processing circuitry, cause the processing circuitry to perform operations to implement of any of Examples 1-49.

Example 51 is an apparatus comprising means to implement of any of Examples 1-49.

Example 52 is a system to implement of any of Examples 1-49.

Example 53 is a method to implement of any of Examples 1-49.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An apparatus of an access point (AP) configurable for unlicensed operation in a 6 Gigahertz (GHz) band, the apparatus comprising:
   memory; and
   processing circuitry, the processing circuitry configured to:
   generate a physical layer convergence procedure (PLCP) protocol data unit (PPM) to include a signalling field encoded to indicate a notching pattern, the notching pattern comprising four bits, each bit corresponding to one of a plurality of 20 MHz channels in an 80 MHz portion of the PPDU, the PPDU being one of an 80 MHz PPDU, a 160 MHz PPDU and a 320 MHz PPDU;
   wherein the notching pattern indicates which one or more of the 20 MHz channels in the 80 MHz portion are notched, and
   encode the PPDU for transmission in the 6 GHz band, wherein transmitted signal levels within the one or more of the 20 MHz channels to be notched are lowered to reduce interference.

2. The apparatus of claim 1, wherein the one or more of the 20 MHz channels to be notched correspond to incumbent system operation in the 6 GHz band, and
   wherein the transmitted signal levels within the one or more of the 20 MHz channels to be notched are lowered to reduce interference with the incumbent system operation.

3. The apparatus of claim 2, wherein the processing circuitry further encodes the signalling field to indicate a relevant 80 MHz portion of the PPDU that the notching pattern is applied to.

4. The apparatus of claim 3, wherein the signalling field that indicates the notching pattern is encoded as part of a physical layer of the PPDU.

5. The apparatus of claim 4, wherein processing circuitry is configured to use orthogonal frequency division multiple access (OFDMA) for transmission of the PPDU.

6. The apparatus of claim 5, wherein an 80 MHz PPDU has a transmission bandwidth of 80 MHz, a 160 MHz PPDU has a transmission bandwidth of 160 MHz, and a 320 MHz PPDU has a transmission bandwidth of 320 MHz, and
wherein after encoding the PPDU for transmission, the processing circuitry is to configure the AP to apply a transmit filter to reduce signal levels of the one or more of the 20 MHz channels to be notched, the one or more 20 MHz channels to be notched being with the transmission bandwidth of the PPDU.

7. The apparatus of claim 6, wherein the memory is configured to store the notching pattern.

8. The apparatus of claim 7, wherein the processing circuitry includes a baseband processor.

9. A non-transitory computer-readable storage medium that stores instructions for execution by processing circuitry of an access point (AP) configurable for unlicensed operation in a 6 Gigahertz (GHz) band, the processing circuitry configured to:
generate a physical layer convergence procedure (PLCP) protocol data unit (PPDU) to include a signalling field encoded to indicate a notching pattern, the notching pattern comprising four bits, each bit corresponding to one of a plurality of 20 MHz channels in an 80 MHz portion of the PPDU, the PPDU being one of an 80 MHz PPDU, a 160 MHz PPDU and a 320 MHz PPDU;
wherein the notching pattern indicates which one or more of the 20 MHz channels in the 80 MHz portion are notched, and
encode the PPDU for transmission in the 6 GHz band, wherein transmitted signal levels within the one or more of the 20 MHz channels to be notched are lowered to reduce interference.

10. The non-transitory computer-readable storage medium of claim 9, wherein the one or more of the 20 MHz channels to be notched correspond to incumbent system operation in the 6 GHz band, and
wherein the transmitted signal levels within the one or more of the 20 MHz channels to be notched are lowered to reduce interference with the incumbent system operation.

11. The non-transitory computer-readable storage medium of claim 10, wherein the processing circuitry further encodes the signalling field to indicate a relevant 80 MHz portion of the PPDU that the notching pattern is applied to.

12. The non-transitory computer-readable storage medium of claim 5, wherein the signalling field that indicates the notching pattern is encoded as part of a physical layer of the PPDU.

13. The non-transitory computer-readable storage medium of claim 12, wherein processing circuitry is configured to use orthogonal frequency division multiple access (OFDMA) for transmission of the PPDU.

14. The non-transitory computer-readable storage medium of claim 13, wherein an 80 MHz PPDU has a transmission bandwidth of 80 MHz, a 160 MHz PPDU has a transmission bandwidth of 160 MHz, and a 320 MHz PPDU has a transmission bandwidth of 320 MHz, and
wherein after encoding the PPDU for transmission, the processing circuitry is to configure the AP to apply a transmit filter to reduce signal levels of the one or more of the 20 MHz channels to be notched, the one or more 20 MHz channels to be notched being with the transmission bandwidth of the PPDU.

15. An apparatus of non-access point (AP) station (STA) configurable for unlicensed operation in a 6 Gigahertz (GHz) band, the apparatus comprising:
memory; and
processing circuitry, the processing circuitry configured to:
decode a physical layer convergence procedure (PUT) protocol data unit (PPDU) that includes a signalling field indicating a notching pattern, the notching pattern comprising four bits, each bit corresponding to one of a plurality of 20 MHz channels in an 80 MHz portion of the PPDU, the PPDU being one of an 80 MHz PPDU, a 160 MHz PPDU and a 320 MHz PPDU,
wherein the notching pattern indicates which one or more of the 20 MHz channels in the 80 MHz portion are notched,
wherein the PPDU is received from an AP in the 6 GHz hand, and
wherein signal levels within the one or more of the 20 MHz channels that are indicated as being notched are lowered to reduce interference.

16. The apparatus of claim 15, wherein the one or more of the 20 MHz channels that are notched correspond to incumbent system operation in the 6 GHz band, and
wherein the received signal levels within the one or more of the 20 MHz channels that are notched are lowered to reduce interference with the incumbent system operation.

17. The apparatus of claim 16, wherein the processing circuitry is further configured to decode the signalling field to determine a relevant 80 MHz portion of the PPDU that the notching pattern has been applied to.

18. The apparatus of claim 17, wherein the signalling field that indicates the notching pattern is part of a physical layer of the PPDU.

19. The apparatus of claim 18, wherein the PPDU is transmitted using orthogonal frequency division multiple access (OFDMA).

20. The apparatus of claim 19, wherein an 80 MHz PPDU has a transmission bandwidth of 80 MHz, a 160 MHz PPDU has a transmission bandwidth of 160 MHz, and a 320 MHz PPDU has a transmission bandwidth of 320 MHz, and
wherein the processing circuitry is configured to refrain from decoding the one or more of the 20 MHz channels to be notched, the one or more 20 MHz channels to be notched being with the transmission bandwidth of the PPDU.

21. The apparatus of claim 20, wherein the memory is configured to store the notching pattern.

22. The apparatus of claim 21, wherein the processing circuitry includes a baseband processor.

* * * * *

UNITED STATES PATENT AND TRADEMARK OFFICE
CERTIFICATE OF CORRECTION

PATENT NO. : 11,310,671 B2
APPLICATION NO. : 16/646319
DATED : April 19, 2022
INVENTOR(S) : Cariou et al.

Page 1 of 1

It is certified that error appears in the above-identified patent and that said Letters Patent is hereby corrected as shown below:

In the Claims

In Column 22, Line 41, in Claim 1, delete "(PPM)" and insert --(PPDU)-- therefor In Column 23, Line 51, in Claim 12, delete "claim 5," and insert --claim 11,-- therefor In Column 24, Line 15, in Claim 15, delete "(PUT)" and insert --(PLCP)-- therefor In Column 24, Line 26, in Claim 15, delete "hand," and insert --band,-- therefor Signed and Sealed this
Twentieth Day of December, 2022

*Katherine Kelly Vidal*

Katherine Kelly Vidal
*Director of the United States Patent and Trademark Office*